(No Model.) 4 Sheets—Sheet 2.
D. HÖNIG.
VELOCIPEDE FOR TRANSPORTING SICK PERSONS.
No. 550,888. Patented Dec. 3, 1895.
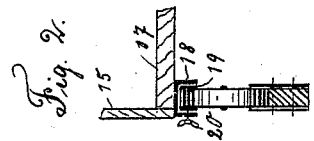
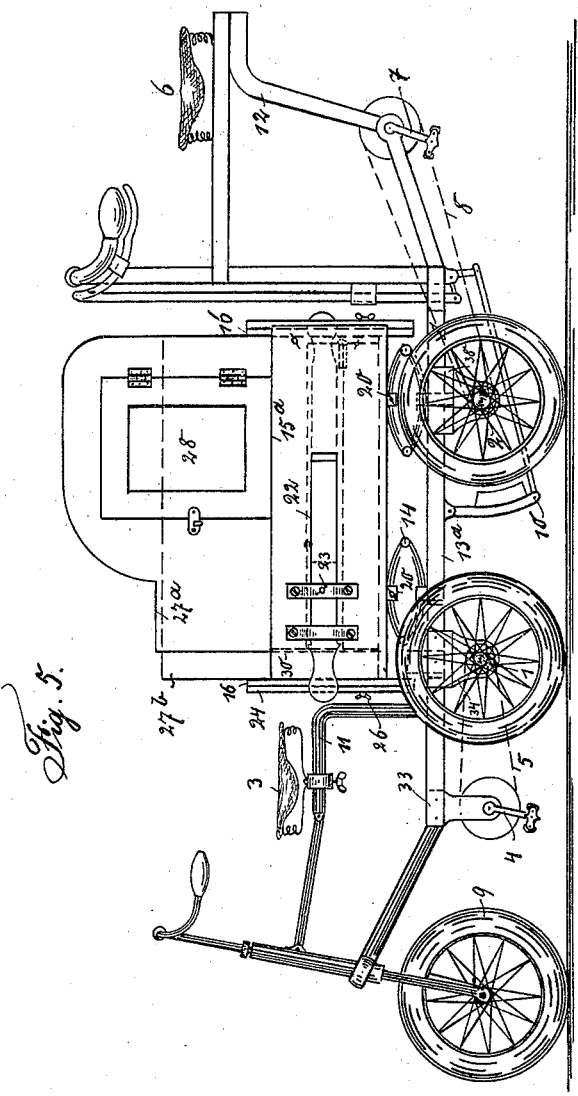
Witnesses
George Baumann
Inventor
David Hönig
By his Attorneys
Howson & Howson (No Model.) 4 Sheets—Sheet 3.
D. HÖNIG.
VELOCIPEDE FOR TRANSPORTING SICK PERSONS.
No. 550,888. Patented Dec. 3, 1895.
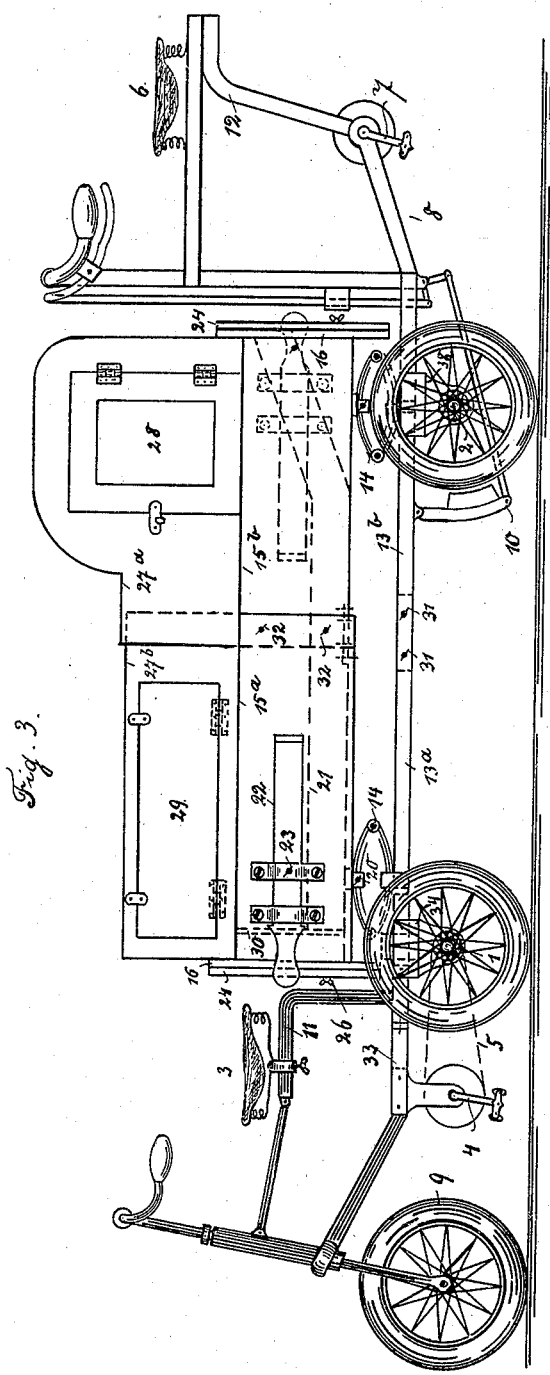

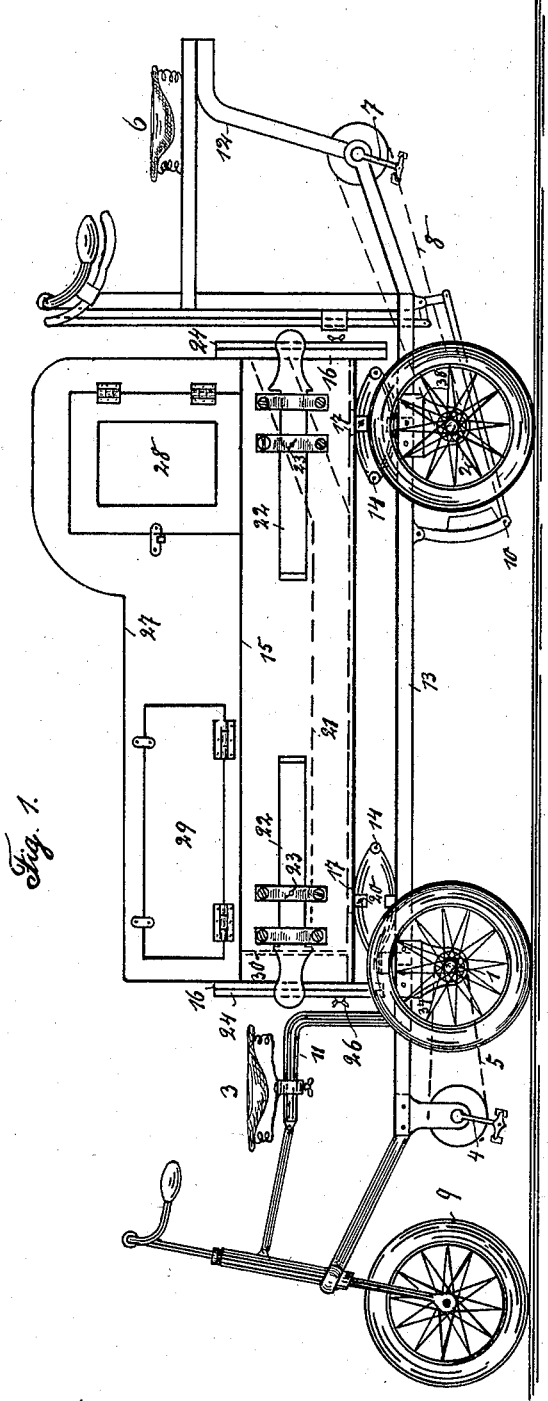

(No Model.) 4 Sheets—Sheet 4.
D. HÖNIG.
VELOCIPEDE FOR TRANSPORTING SICK PERSONS.
No. 550,888. Patented Dec. 3, 1895.
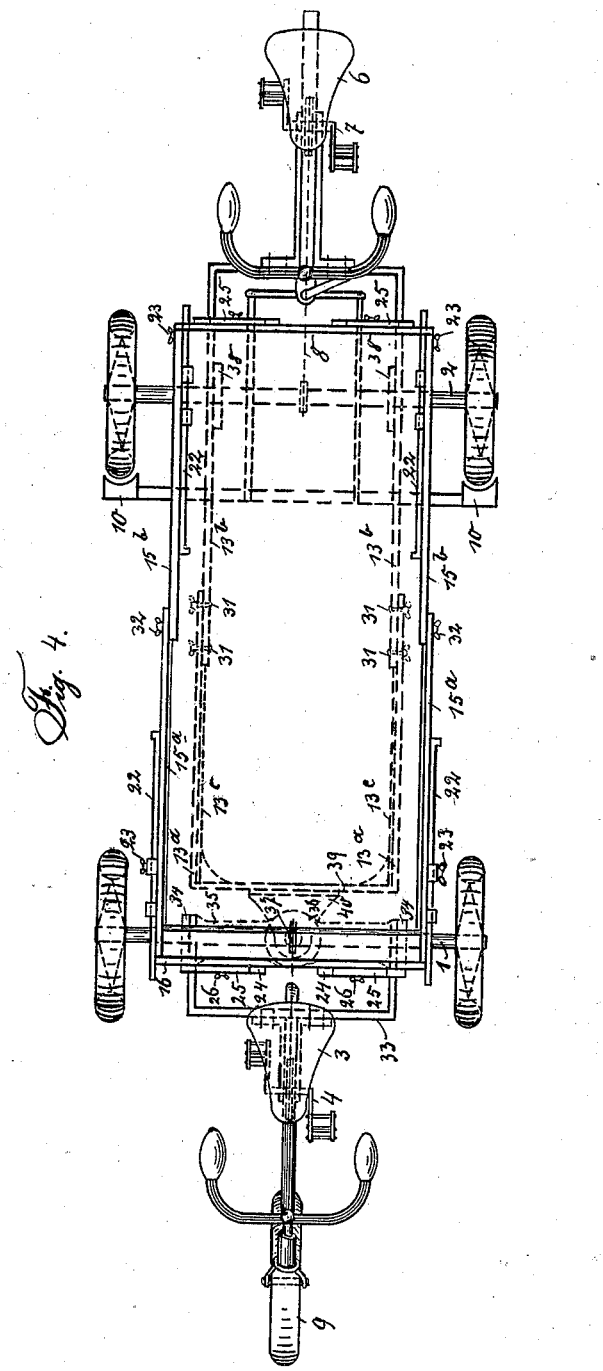
Witnesses
George Baumann
S. C. Connor
Inventor
David Hönig
By his Attorneys
Howson & Howson

UNITED STATES PATENT OFFICE.

DAVID HÖNIG, OF BERLIN, GERMANY.

VELOCIPEDE FOR TRANSPORTING SICK PERSONS.

SPECIFICATION forming part of Letters Patent No. 550,888, dated December 3, 1895.

Application filed December 18, 1894. Serial No. 532,514. (No model.)

*To all whom it may concern:*

Be it known that I, DAVID HÖNIG, doctor of medicine, Wilhelmstrasse 43$^b$, Berlin, German Empire, have invented Improvements in Velocipedes for Transporting Sick or Wounded Persons, of which the following is a specification.

The velocipede or cycle vehicle is characterized by the couch being capable of being lifted off the frame and, if necessary, used as a stretcher or even as a bedstead.

On the accompanying drawings, Figure 1 shows a side view of such a cycle invalid-carriage. Fig. 2 shows in detail the connection of the removable bed or couch with the frame of the carriage. Figs. 3 and 4 show in side and plan view, respectively, a modification of the cycle-carriage. The bed or couch and also the cover or roof can be collapsed or pushed together. Fig. 5 shows this improved arrangement when in a collapsed condition.

As may be seen from Figs. 1, 3, and 4, the cycle-vehicle has two two-wheeled axles 1 and 2, one of which is driven from the front seat 3 by means of treadle-crank 4 and chain 5 and the other from the rear seat 6 by means of treadle-crank 7 and chain 8.

The two bearings 34 of the front-wheel axle, which bearings are attached to the frame 33, are connected by means of a cross-bar 35, Fig. 4, lying above this axle. This cross-bar forms in the center a somewhat projecting round disk 36, in the center of which a round pin 37 is seated.

A plate 40 is attached to the front cross-head 39 of the main frame 13 or 13$^a$ 13$^b$, which frame is firmly connected with the bearings 38, and this plate 40 is fitted on the pin 37 by means of a socket exactly fitting the same, so that the two wheel-axles may assume an angular position to one another and the vehicle can safely travel round even small curves. The person occupying the front seat can also at the same time operate the steering-wheel 9, the person on the rear seat operating the brake 10. The support 11, carrying the front seat, is connected with the frame 33, the support 12 for the rear seat to the rear end of the main frame 13, or rather 13$^a$ 13$^b$. Carriage-springs 14 are fixed on the frame 13, on which springs the stretcher or couch rests. The side pieces 15 of this couch are connected by cross-strips 17 in addition to the end cross-pieces 16. (See Fig. 2.) Holders 18 are attached to these strips 17 in a position corresponding to the springs 14. These holders engage the connecting-pieces 19, which maintain the upper spring-support in position and are firmly and yet easily removably connected with the springs by means of screws 20, which fit into holes in the connecting-piece. The cross-strips 17 also serve as points of support for the mattress 21, which is shown in dotted lines in Fig. 1. Strips 22, which may be pushed in or drawn out, are arranged on the sides of the couch, which strips 22 may be fixed in either position by means of clamp-screws 23. If these screws 23 be relaxed, the strips 22 drawn out, and the connection of the couch and the springs 14 be also removed by slackening the screws 20, the couch may with the assistance of the bars 22 be lifted, together with the sick person lying on the mattress, and utilized as a stretcher or carrying appliance.

On the ends 16 of the couch adjustable feet 25 are arranged between the guide-bars 24, Fig. 4, which feet may be pushed downward and fixed by means of clamp-screws 26 in this extended position. This arrangement renders it possible to convert the couch after it has been lifted off the carriage without further difficulty into a bedstead with feet.

In order to protect from the weather the sick person while being conveyed, a hood or covering 27 is provided, in which at the head end are easily-opened side windows 28, and at the foot end doors 29, which may be let down, as required.

A chamber may be formed at the foot end of the couch by inserting an intermediate partition 30, which chamber serves to hold a case containing materials for bandages, medicaments, and surgical instruments.

In the modification shown in Figs. 3, 4, and 5 the two longitudinal sides of the main frame consist of two halves 13$^a$ and 13$^b$, which may be pushed together. One half is for this object provided with a guide-groove 13$^c$, as well as with clamp-screws 31 for fixing the two halves either in an extended or in a collapsed position. The sides of the couch also consist of two halves 15$^a$ and 15$^b$, which can be pushed together, and one half is here again provided with a guide-groove 15ᶜ for the second half as well as with clamp-screws 32, by means of which both halves may be rigidly connected with one another. The mattress consists in this case of two halves, which may be placed one behind the other or one above the other. The covering or roof is also composed of two halves 27ᵃ and 27ᵇ, which may be pushed together, so that this modification of the invalid-carriage while being stored or while being conveyed to the place from which the sick person or invalid is to be brought may be in a shut-up condition, as shown in Fig. 5. The advantage of this is that the carriage requires considerably less room, and, further, it is possible to travel faster with it in that condition. When the place where it is to be used is reached, the cover or roof is lifted off, the clamp-screws 31 and 32 slackened, the frame with the couch drawn apart, the clamp-screws again tightened, and the mattress laid back, so that it is then ready to receive an occupant.

Having now particularly described and ascertained the nature of the said invention and in what manner the same is to be performed, I declare that what I claim is—

1. An ambulance adapted to be propelled by foot-power, comprising two two-wheeled axles and a front steering-wheel, the front two-wheeled axle and the steering wheel resembling an ordinary tricycle, a frame carrying the rear two-wheeled axle, and pivoted to the bearings of the said front-axle the said frame being provided with springs to support a couch, and foot-power driving mechanism, substantially as and for the purposes set forth.

2. The combination of a foot-propelled vehicle comprising two two-wheeled axles and a front steering wheel, the front two-wheeled axle and the steering wheel resembling an ordinary tricycle, a frame carrying the rear two-wheeled axle and pivoted to the bearings of the said front axle, the said frame being provided with springs and foot power driving mechanism, with a stretcher provided with devices for locking it to the said frame, substantially as set forth.

In testimony whereof I have signed my name to this specification in the presence of two subscribing witnesses.

DAVID HÖNIG.

Witnesses:
 G. T. HOFFMANN,
 H. KRONEWITTER.